US005436873A

United States Patent [19]

MacLauchlan et al.

[11] Patent Number: 5,436,873

[45] Date of Patent: Jul. 25, 1995

[54] ELECTROSTATIC SHIELD FOR ELECTROMAGNETIC ACOUSTIC TRANSDUCER NOISE REJECTION

[75] Inventors: Daniel T. MacLauchlan; Paul J. Latimer, both of Lynchburg, Va.

[73] Assignee: The Babcock & Wilcox Company, New Orleans, La.

[21] Appl. No.: 251,542

[22] Filed: May 31, 1994

[51] Int. Cl.[6] .................... H04R 23/00; G01N 9/24; G01N 29/04

[52] U.S. Cl. .................... 367/140; 73/643

[58] Field of Search .................... 73/643; 367/140

[56] References Cited

U.S. PATENT DOCUMENTS

| | | | |
|---|---|---|---|
| 4,149,421 | 4/1979 | Bottcher et al. | 73/643 |
| 4,296,486 | 10/1981 | Vasile | 367/140 |
| 5,140,860 | 8/1992 | Huschelrath et al. | 73/643 |
| 5,164,921 | 11/1992 | Graff et al. | 367/140 |

*Primary Examiner*—J. Woodrow Eldred
*Attorney, Agent, or Firm*—Robert J. Edwards; Eric Marich

[57] ABSTRACT

A shield for an electromagnetic acoustic transducer (EMAT) has multiple layers of electrically insulating and electrically conductive materials which contain a coil of the EMAT. A first insulating layer lies directly on top of the coil and is attached thereto by a suitable layer of non-conductive adhesive. A second layer having both insulating and conductive portions is provided on a side of the coil opposite the first insulating layer such that the coil is completely encapsulated within and in direct contact only with the insulating portions of the first and second layers. The insulating portion of the second layer has a high electrical resistance. A third, conductive layer having a conductive adhesive side is provided in contact with the conductive portion of the second layer. The third layer is also provided with a window extending completely therethrough having dimensions coextensive with those of the coil; shielding of the coil itself by this third layer is thus prevented. Finally, a fourth insulating layer preferably made of a thin layer of ultrahigh molecular weight polyethylene or similar insulating material is attached to the underlying third, conductive layer by adhesive means.

18 Claims, 1 Drawing Sheet

ELECTROSTATIC SHIELD FOR ELECTROMAGNETIC ACOUSTIC TRANSDUCER NOISE REJECTION

FIELD AND BACKGROUND OF THE INVENTION

The present invention relates in general to ultrasonic testing and electromagnetic acoustic transducers (EMATs) and, in particular, to a new and useful electrostatic shield for a coil of an electromagnetic acoustic transducer for reducing noise from various sources.

Current ultrasonic tests are contact techniques in which a piezoelectric transducer is coupled to a component surface by a fluid or gel. For electrically conductive materials, ultrasonic waves can be produced by electromagnetic acoustic wave induction. Electromagnetic acoustic transducers (EMATs) are the basis of a noncontact ultrasonic inspection method that requires no fluid couplant because the sound is produced by an electromagnetic acoustic interaction within the material. This technique can be used to eliminate the couplant, which complicates testing procedures, slows inspection rates, and can introduce errors into the measurement. In fact, in some cases, conventional ultrasonic tests cannot even be conducted because of the couplant.

In contrast to conventional contact ultrasonic testing, where a mechanical pulse is coupled to the workpiece being inspected in an EMAT, the acoustic wave is produced by the interaction of a magnetic field with induced surface currents. The coil of the EMAT induces eddy currents at the surface of the conductor. A constant magnetic field provided by an AC, DC or pulse driven electromagnet or a permanent magnet is positioned near the coil. The interaction of the magnetic field with the induced eddy currents produces a force called the Lorentz force. This Lorentz force interacts with the material to produce an ultrasonic pulse.

As shown in FIG. 1, a simple EMAT 10 consists of a coil of wire 12 and a permanent or electromagnet 14. A strong magnetic field, B, is produced at the surface of an electrically conductive workpiece 16 being tested by the permanent magnet or electromagnet 14. Eddy currents EC with density J are induced in a surface 18 of the workpiece 16 by the coil 12 which is driven at a high excitation frequency by an oscillator 20 (not shown). The Lorentz force F resulting from the alternating current flow in the presence of the magnetic field is transferred to the workpiece 16 and produces an ultrasonic wave UW (with the same frequency as the excitation frequency) that propagates through the workpiece 16.

Various configurations of the coil 12 may be used along with different directions of the magnetic field B to produce a variety of ultrasonic wave modes with unique properties in addition to the conventional longitudinal and shear vertical (S.V.) shear waves. In conductors that are ferromagnetic, a second force (magnetostriction) is added to the Lorentz force, which makes ferromagnetic materials particularly suitable for sensitive EMAT inspection.

EMAT instrumentation involves the reception of low level signals; as such, EMATs are susceptible to noise pickup from many different sources. To minimize noise pickup, careful shielding and grounding is very important. This aspect has been recognized from the very early stages of EMAT development, and the use of shielded cables and instrumentation is well documented in the literature.

Vasile (U.S. Pat. No. 4,296,486) discloses shielded electromagnetic acoustic transducers including a source of magnetic flux (28, 30, 32, 34, 36) for establishing a static magnetic field, an electrical conductor (38) for conducting an alternating current in the static magnetic field, and an electrically conductive, nonmagnetic shield (46) disposed between the source of magnetic flux and the conductor. In the preferred embodiment, the shield (46) is provided in the form of a thin metallic sheet in contact with the source of magnetic flux and spaced from the conductor. As discussed at Col. 4, lines 3–15 of Vasile, the shield (46) acts as a ground plane and reduces losses associated with the eddy currents which are induced in the magnets by the coil (38), and the shield (46) also helps to reduce the impedance level of the EMAT (26), while causing only a minimal loss in the magnetic field strength.

Vasile thus shields his magnet from the EMAT. However, there is no known mention of shielding of the actual EMAT coil itself from the workpiece or conductor, despite the fact that the EMAT coil acts as an antenna for noise pickup from the conductor being tested as well as from electromagnetic radiation sources.

The present invention addresses this overlooked aspect and presents a unique approach to shielding EMAT coils that can provide a totally shielded EMAT system when used with the aforementioned shielded cables and instrumentation.

SUMMARY OF THE INVENTION

One aspect of the present invention is drawn to a shield for a coil of an electromagnetic acoustic transducer (EMAT). The shield has multiple layers of electrically insulating and electrically conductive materials which contain the coil therein. A first layer, made of electrically insulating material, lies directly on top of the coil and is attached thereto by a suitable layer of non-electrically conductive adhesive. A second layer, made of material having both electrically insulating and electrically conductive portions, is provided on a side of the coil opposite the first layer such that the coil is completely encapsulated within and in direct contact only with the electrically insulating portions of the first and second layers. The electrically insulating portion of the second layer has a high electrical resistance. A third layer, made of electrically conductive material, has an electrically conductive adhesive side which contacts the electrically conductive portion of the second layer. The third layer is also provided with a window extending completely therethrough and having dimensions coextensive with those of the coil to prevent shielding by the third layer of signals produced by the coil itself. Finally a fourth layer made of thin, durable, electrically insulating material is provided and attached to the underlying third, electrically conductive layer by adhesive means.

Another aspect of the present invention is drawn to a shielded electromagnetic acoustic transducer (EMAT) sensor assembly for inspecting a workpiece and having a magnet, a coil, and a shield having multiple layers of electrically insulating and electrically conductive materials which contain the coil therein, the shield comprising the aforementioned structure, the first layer of the shield being located proximate to the magnet, together with means for securing the shield containing the coil to the magnet so that the fourth layer is located proximate the workpiece.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

DESCRIPTION OF THE PREFERRED EMBODIMENTS

The present invention pertains to an electromagnetic shield covering for a coil of an electromagnetic acoustic transducer (EMAT). When utilizing EMATs, transduction takes place within an electromagnetic skin depth of the surface of the workpiece being tested. Thus, it is necessary that the electromagnetic shield for the EMAT coil, according to the present invention, have a thickness which is much less than a skin depth in the shield material at the frequency of the test in order to avoid exciting ultrasonic waves in the covering forming the shield itself or to avoid attenuating the electromagnetic coupling of the EMAT to the workpiece.

Figure 1:
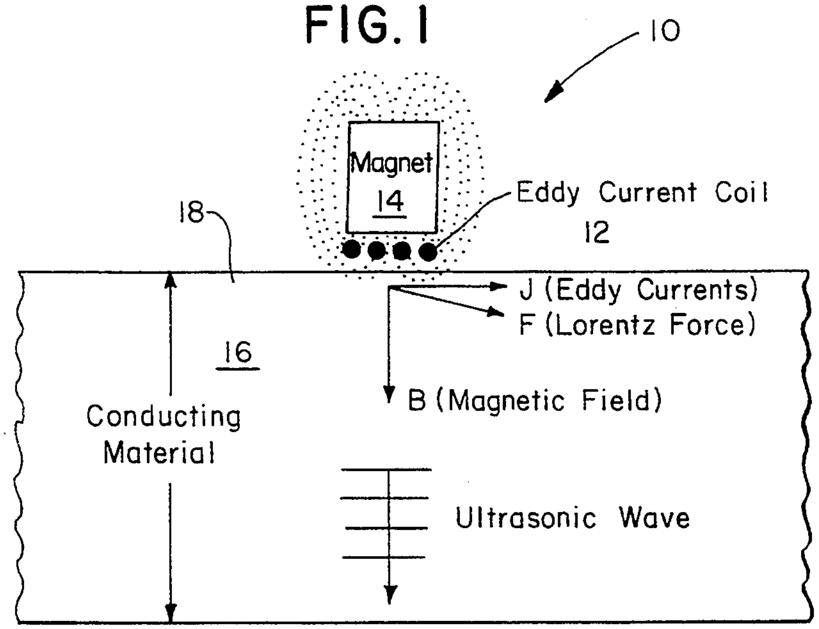
FIG. 1 is a schematic representation of a typical electromagnetic acoustic transducer (EMAT) sensor assembly located adjacent to a workpiece to be tested.
Figure 2:
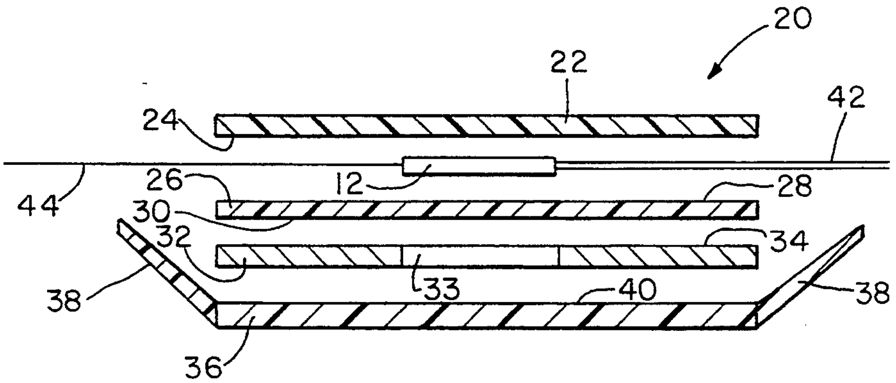
FIG. 2 is an exploded side view of an electrostatic shield for a coil of an EMAT sensor assembly according to the teachings of the present invention.
Figure 3:
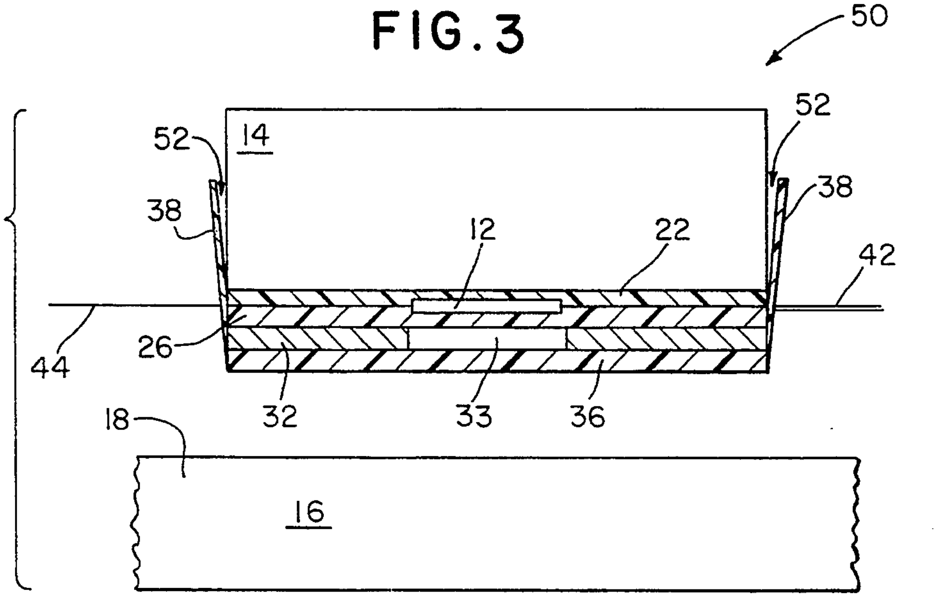
FIG. 3 is a side view of an EMAT sensor assembly with a shielded coil according to the teachings of the present invention.

Referring to the drawings generally, wherein like numerals designate the same or similar elements throughout the several drawings, and to FIGS. 2 and 3, one aspect of the present invention is drawn to an electrostatic shield 20 for a coil 12 of an EMAT sensor assembly 50. The shield 20 is comprised of multiple layers of electrically insulating and electrically conductive materials which contain the coil 12 therein.

The first layer, which when applied as a part of the EMAT sensor assembly 50 would be nearest the magnet 14, is an electrically insulating layer 22. It is preferably comprised of a polyimide such as Kapton®, Teflon®, or Mylar® (all trademarks of E. I. DuPont de Nemours and Co.) or similar materials. Electrically insulating layer 22 lies directly on top of coil 12 and is attached thereto by a suitable layer of non-electrically conductive adhesive 24. The layer 22 is preferably made from Kapton® tape; alternatively, it can comprise a Kapton® substrate on which a flexible copper EMAT coil 12 has been etched. The material for layer 22 can be virtually any type of insulating material depending upon the application. In some applications, a flexible material is preferred. In other applications, such as high temperature testing, an insulator with good high temperature properties such as Kapton® or a ceramic would be preferred. Since this layer 22 does not go between the EMAT coil 12 and the workpiece 16 being inspected, there is no requirement to keep this layer 22 as thin as possible to minimize signal loss.

A second layer 26 having both electrically insulating and electrically conductive portions is provided on a side of the coil 12 opposite the first electrically insulating layer 22, and preferably comprises a thin (approximately 0.5–2 mils thick to minimize signal loss) layer of metalized plastic such as aluminized polypropylene, or similar material, having an electrically conductive surface on one side and an electrically insulating surface on the other. The electrically insulating surface would go up against the EMAT coil 12, while the other electrically conductive surface is on the opposite side. The electrically conductive surface is much thinner than the skin depth in this electrically conductive material, at the ultrasonic frequencies being used.

Alternatively, second layer 26 could be comprised of two separate sub-layers, one being the electrically conductive portion while the other is the electrically insulating portion, to provide the required characteristics. The electrically insulating layer could be virtually any thin insulating material such as plastic, fiberglass, or ceramic. The electrically conductive layer could be virtually any thin, conductive metal, such that the thickness is much less than a skin depth at the ultrasonic frequency. These metals could be copper, aluminum, gold, silver, titanium, stainless steel, etc. The thin layer of aluminized polypropylene 26 has a fairly high resistance and is typically very fragile. The polypropylene side 28 of layer 26 is in contact with the coil 12 while aluminized side 30 is opposite the polypropylene side and in contact with a third, electrically conductive layer 32 described below. As such, the coil 12 is completely encapsulated within and in direct contact only with the electrically insulating materials or portions thereof comprising layers 22 and 26.

The third, electrically conductive layer 32 is preferably a layer of thin (0.5–2 mils thick) conductor such as copper, aluminum, or silver having an electrically conductive adhesive side 34 in contact with the aforementioned electrically conductive portion of the second layer 26, such as the aluminized side 30 of aluminized polypropylene layer 26. This material provides a low resistance path for noise potentials picked up on the thin conductor of the second layer 26 to be shorted to the preamplifier common (not shown). This layer 32 should not cover the EMAT coil 12 itself, since it would severely attenuate the electromagnetic coupling between the EMAT coil 12 and the workpiece 16. As such, electrically conductive layer 32 is provided with a window or aperture 33 extending completely through electrically conductive layer 32 and having dimensions coextensive with those of the EMAT coil 12; shielding of the EMAT coil 12 signals by this third electrically conductive layer 32 is thus prevented.

Finally a fourth electrically insulating layer 36, advantageously comprising a thin (1–10 mils thick) layer of ultrahigh molecular weight polyethylene tape or similar electrically insulating material, is provided. This layer 36 provides electrical insulation of the workpiece 16 from the EMAT sensor assembly 50, and in some scanning applications provides a durable wear surface. Electrically insulating layer 36 could also be made of fiberglass, plastic, or ceramic depending on the application. Attachment tabs 38 are provided on opposite ends of this layer 36 to facilitate attachment of the entire shielded EMAT sensor assembly 50 to sides 52 of the magnet 14, as is shown in FIG. 3. Electrically insulating layer 36 is attached to the underlying third, electrically conductive layer 36 by means of adhesive backing or tape 40.

In some constructions, this fourth layer 36 may be comprised of two separate layers. The outermost layer which would contact the workpiece 16 would be a thin (1–3 mils thick) layer of poorly conducting metal such as titanium or stainless steel. The particular material is chosen to produce very little attenuation to the produced EMAT signals, and to provide a rugged wear surface in hostile environments. The second layer would be a thin (1–3 mils thick) electrically insulating layer to insulate the EMAT shields from the metal wear surface. The second layer could be virtually any thin electrically insulating material such as plastic, ceramic, or fiberglass.

To complete the shielded EMAT sensor assembly 50, leads 42 are provided to electrically connect the coil 12 with EMAT coil electronics (not shown) in a manner well known to those skilled in the art. Leads 44 are also provided to a receiver common or ground terminal (also not shown) to provide an electrostatic shield to noise potentials on a workpiece 16.

The fourth, electrically insulating layer 36 provides a durable wear surface for the EMAT 50, and the combination of the thin layer 26 of aluminized polypropylene or similar material over the active part of the EMAT coil 12 surrounded by the electrically conductive layer 32 allows the EMAT sensor assembly 50 to send and receive signals with virtually no loss in signal amplitude while providing a low resistance shield to capacitively coupled noise.

While specific embodiments of the invention have been shown and described in detail to illustrate the application of the principles of the invention, it will be understood that the invention may be embodied otherwise without departing from such principles.

We claim:

1. A shield for a coil of an electromagnetic acoustic transducer (EMAT), the shield having multiple layers of electrically insulating and electrically conductive materials which contain the coil therein, comprising:

a first layer, made of electrically insulating material, lying directly on top of the coil and attached thereto by a suitable layer of non-electrically conductive adhesive;

a second layer, made of material having both electrically insulating and electrically conductive portions, provided on a side of the coil opposite the first layer such that the coil is completely encapsulated within and in direct contact only with the electrically insulating portions of the first and second layers, the electrically insulating portion of the second layer having a high electrical resistance;

a third layer, made of electrically conductive material, having an electrically conductive adhesive side in contact with the electrically conductive portion of the second layer, the third layer having a window extending completely therethrough and having dimensions coextensive with those of the coil to prevent shielding by the third layer of signals produced by the coil; and a fourth layer, made of a thin, durable, electrically insulating material, attached to the underlying third, electrically conductive layer by adhesive means.

2. The shield according to claim 1, wherein the first layer comprises polyimide.

3. The shield according to claim 1, wherein the first layer comprises polyimide substrate on which the coil has been etched as a flexible copper coil.

4. The shield according to claim 1, wherein the first layer comprises a ceramic.

5. The shield according the claim 1, wherein the second layer comprises a thin layer of metalized plastic.

6. The shield according to claim 5, wherein the second layer comprises a thin layer of aluminized polypropylene.

7. The shield according to claim 1, wherein the second layer comprises two separate sub-layers, one being the electrically conductive portion and the other being the electrically insulating portion, the electrically conductive portion being a thin, conductive metal such that its thickness is much less than a skin depth in the conductive metal of the shield at the ultrasonic frequency during an inspection of a workpiece.

8. The shield according to claim 1, wherein the third layer comprises copper.

9. The shield according to claim 1, wherein the fourth layer comprises a thin layer of polyethylene.

10. A shielded electromagnetic acoustic transducer (EMAT) sensor assembly for inspecting a workpiece and having a magnet, a coil, and a shield having multiple layers of electrically insulating and electrically conductive materials which contain the coil therein, the shield comprising:

a first layer, made of electrically insulating material, lying directly on top of the coil and attached thereto by a suitable layer of non-electrically conductive adhesive;

a second layer, made of material having both electrically insulating and electrically conductive portions, provided on a side of the coil opposite the first layer such that the coil is completely encapsulated within and in direct contact only with the electrically insulating portions of the first and second layers, the electrically insulating portion of the second layer having a high electrical resistance;

a third layer, made of electrically conductive material, having an electrically conductive adhesive side in contact with the electrically conductive portion of the second layer, the third layer having a window extending completely therethrough and having dimensions coextensive with those of the coil to prevent shielding by the third layer of signals produced by the coil; and a fourth layer, made of a thin, durable, electrically insulating material, attached to the underlying third, electrically conductive layer by adhesive means; and means for securing the shield containing the coil to the magnet so that the fourth layer is located proximate the workpiece during an inspection.

11. The EMAT sensor assembly according to claim 10, wherein the first layer comprises polyimide.

12. The EMAT sensor assembly according to claim 10, wherein the first layer comprises Kapton®substrate on which the coil has been etched as a flexible copper coil.

13. The EMAT sensor assembly according to claim 10, wherein the first layer comprises a ceramic.

14. The EMAT sensor assembly according to claim 10, wherein the second layer comprises a thin layer of metalized plastic.

15. The EMAT sensor assembly according to claim 14, wherein the second layer comprises aluminized polypropylene.

16. The EMAT sensor assembly according to claim 10, wherein the second layer comprises two separate sub-layers, one being the electrically conductive portion and the other being the electrically insulating portion, the electrically conductive portion being a thin, conductive metal such that its thickness is much less than a skin depth in the conductive metal of the shield at the ultrasonic frequency during an inspection of a workpiece.

17. The EMAT sensor assembly according to claim 10, wherein the third layer comprises copper.

18. The EMAT sensor assembly according to claim 10, wherein the fourth layer comprises a thin layer of polyethylene.

* * * * *